April 30, 1946.　　　C. A. MARTIN　　　2,399,239
MACHINE FOR CUTTING TILE AND LIKE WORKPIECES
Filed Feb. 2, 1944　　　4 Sheets-Sheet 1
Fig. 1.
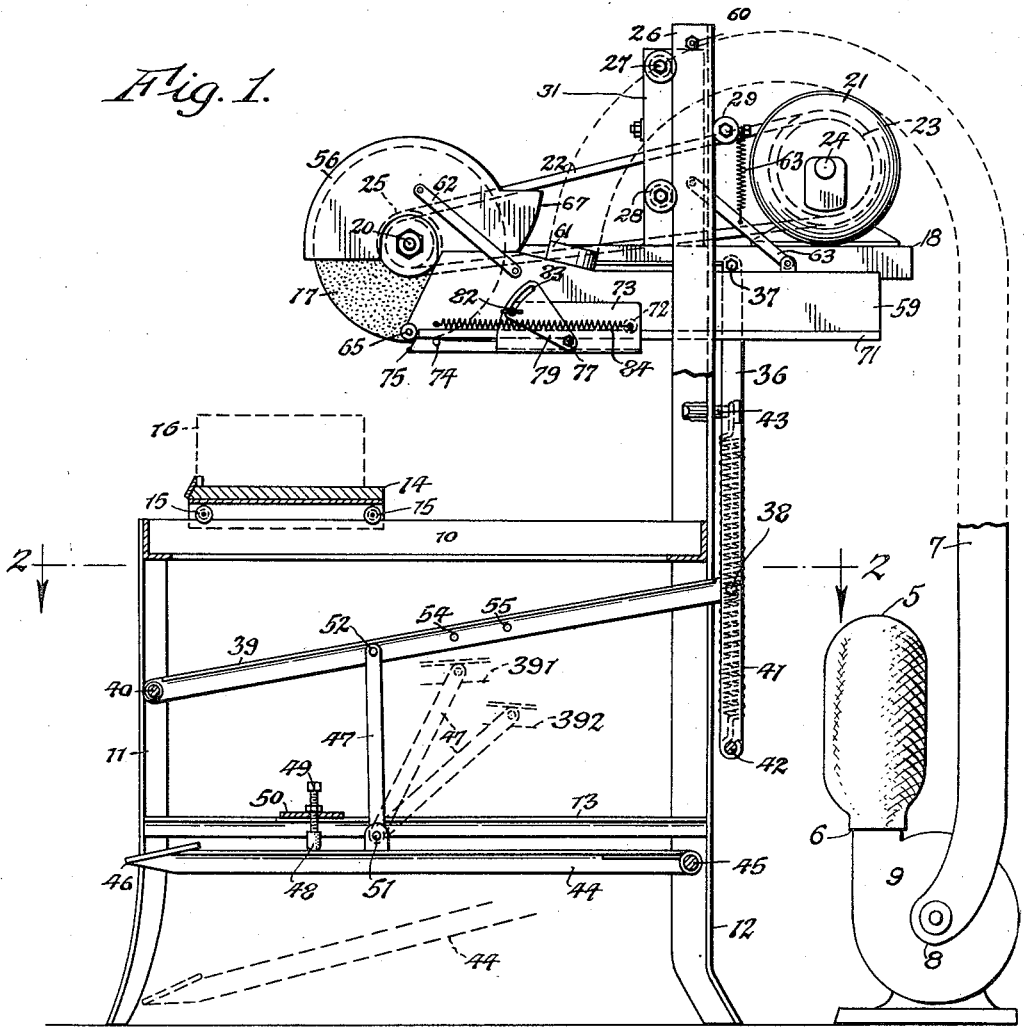
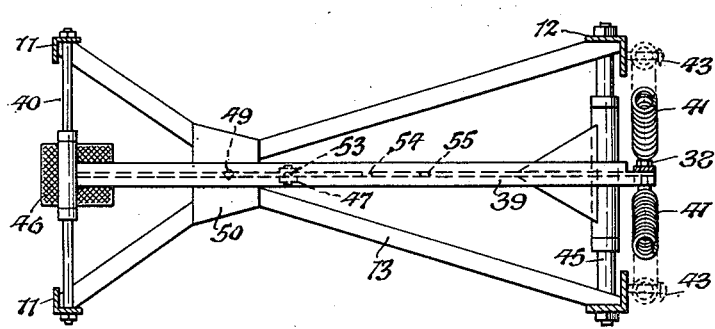
Fig. 2.
INVENTOR
Charles A. Martin
BY Pope & Pope
ATTORNEYS

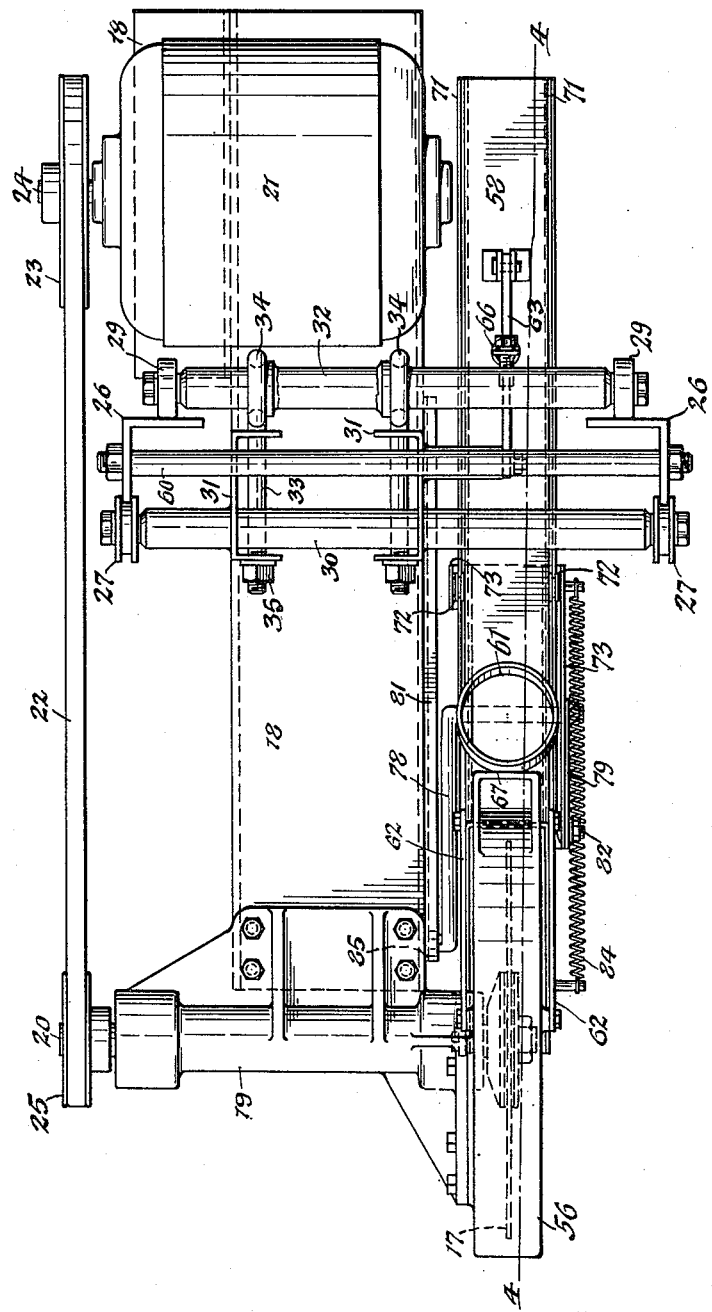

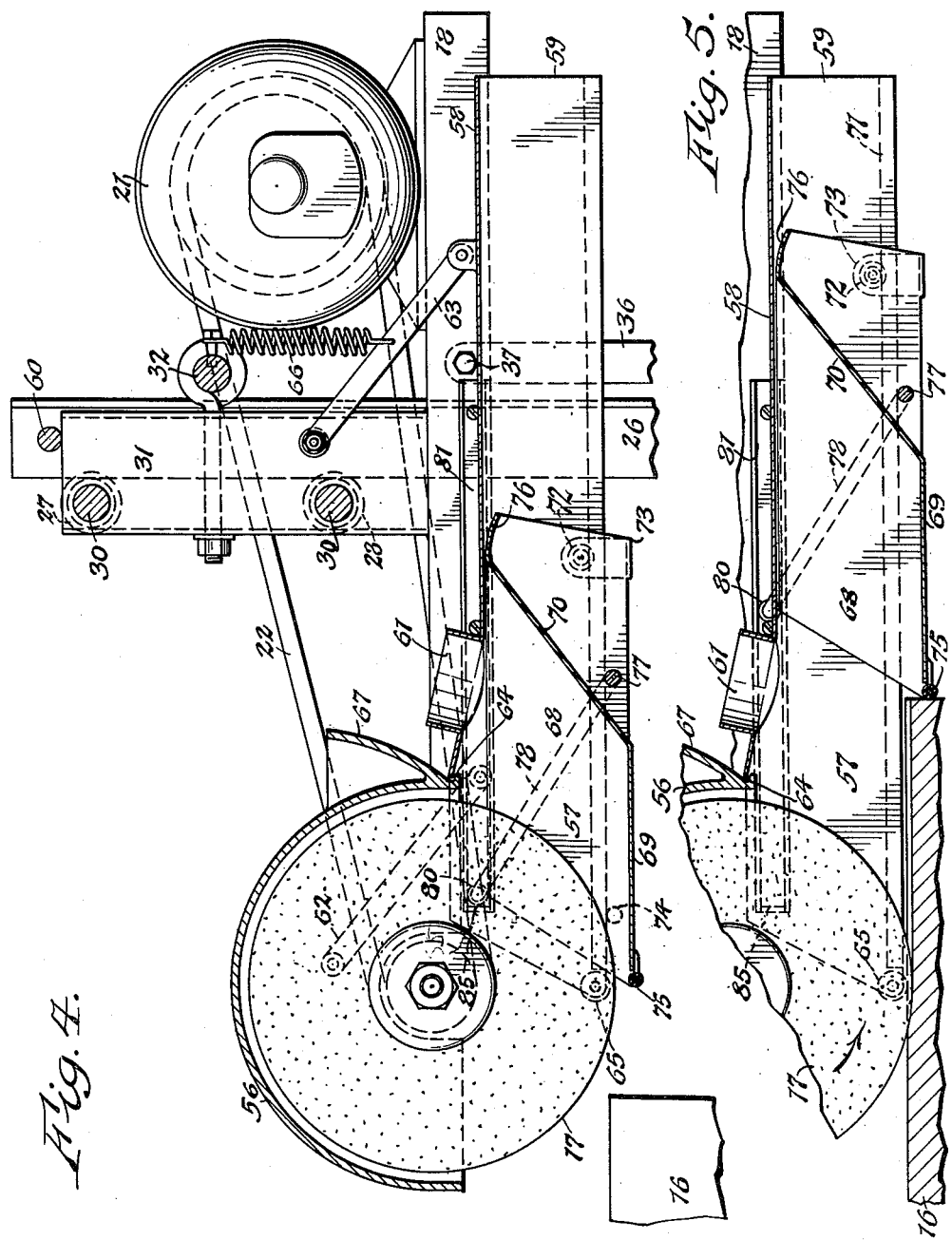

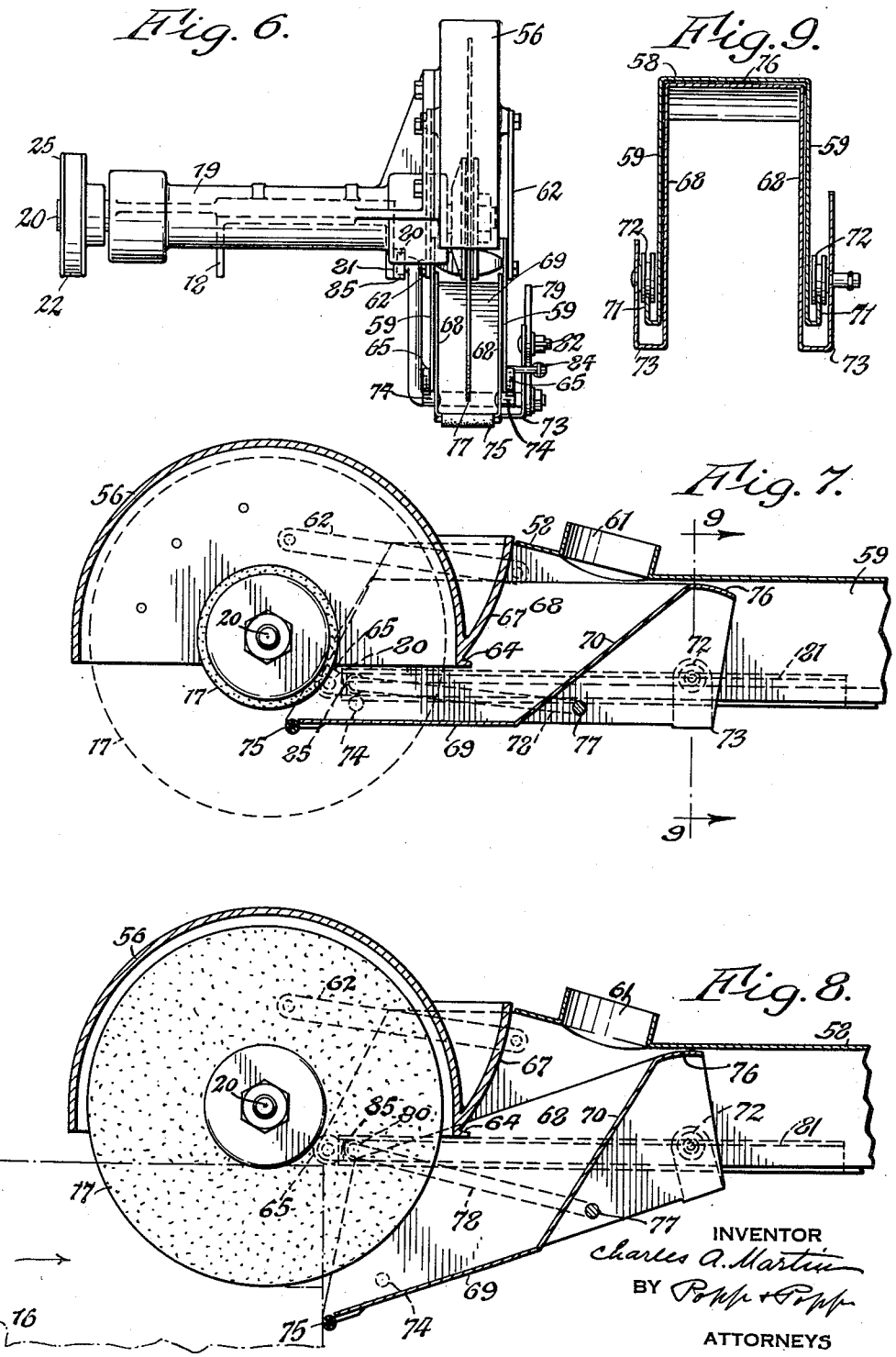

Patented Apr. 30, 1946

2,399,239

UNITED STATES PATENT OFFICE 2,399,239

MACHINE FOR CUTTING TILE AND LIKE WORKPIECES

Charles A. Martin, Buffalo, N. Y.

Application February 2, 1944, Serial No. 520,743

26 Claims. (Cl. 51—92)

This invention relates to a machine for cutting tile, building block, planks and similar articles or workpieces made of cementitious material during the cutting of which an objectionable amount of dust is produced which must be carried away to avoid contaminating the atmosphere in the neighborhood of the machine and endangering the health and comfort of the operator and persons nearby.

One of the objects of this invention is to provide a machine of this character which enables the dust to be effectively taken from the place where it is produced during the operation of cutting the tile or other form of workpiece and reduce to a minimum the amount of air and power for accomplishing this purpose.

Another object of this invention is to so organize the apparatus that the cutting of the tile and carrying away of the dust is effected uniformly and without liability of jamming the apparatus or reducing the suction action on the dust regardless of the angle at which the workpiece is moved past the rotary cutting blade.

A further object of this invention is to provide reliable means whereby the apparatus may be readily and easily adjusted to permit of cutting workpieces of different heights or thicknesses and maintain the dust removing mechanism automatically in the proper relation to the workpiece during the entire cutting operation.

In the accompanying drawings:

Fig. 1 is a side elevation of a machine for cutting cementitious articles embodying a satisfactory embodiment of this invention.

Fig. 2 is a horizontal section of the same, taken on line 2—2, Fig. 1.

Fig. 3 is a top plan view of the cutting and dust collecting parts of the machine, on and enlarged scale.

Fig. 4 is a vertical longitudinal section of the same, taken on line 4—4, Fig. 3 and showing the position of the parts preparatory to beginning the cutting of a workpiece with a circular cutting blade which is new and of full size or diameter.

Fig. 5 is a fragmentary view of the same showing the parts in the position which they occupy after a part of the operation of cutting a workpiece has been effected and the depth of the kerf is comparatively shallow.

Fig. 6 is a front elevation of the parts shown in Fig. 4.

Fig. 7 is a fragmentary view similar to Fig. 4 showing the position of the parts when the diameter of the circular cutting blade has been reduced by wear.

Fig. 8 is a view similar to Fig. 5 but showing the position of the parts when the kerf formed by the cutting blade in the workpiece is relatively deep.

Fig. 9 is a vertical transverse section, taken on line 9—9, Fig. 7.

In the following description similar reference characters indicate like parts in the several figures of the drawings.

The stationary main frame of the machine which supports the several working members may be of any suitable construction but, as best shown in Figs. 1, 2 and 3, comprises a horizontal longitudinal track 10, a pair of front legs 11 extending downwardly from the front part of the track to the ground or floor upon which the machine is supported, a pair of rear legs 12 extending downwardly from the rear part of the track to the ground or floor, and a horizontal brace 13, preferably of X-shape connecting the front and rear legs between the upper and lower ends of the same.

Upon the track is mounted a feed table or platform 14 which is movable lengthwise thereon by means of rollers 15 and adapted to support the workpiece 16 to be cut. The table and workpiece carried thereby are operated manually for carrying the workpiece back and forth underneath a cutter 17 which latter preferably consists of a thin cutter disk or saw blade of suitable abrasive material rotating about an axis arranged horizontally and transversely to the line of movement which is traveled by the table and workpiece while being reciprocated relative to the cutter during the operation of cutting the workpiece.

Means are provided whereby the cutter is moved vertically relatively to the horizontal path of travel of the workpiece which means are preferably constructed as follows:

The numeral 18 represents a vertically movable carriage which preferably has the form of a horizontal channel iron, the front end of which is provided with a bearing 19 in which is journaled a horizontal transverse shaft or arbor 20 to one end of which the rotary cutter 17 is secured. Rotation of the cutter blade is effected by power derived from an electric motor 21 mounted on the rear end of the carriage 18, and a belt 22 passing around a pulley 23 on the motor shaft 24 and a pulley 25 on the opposite end of the cutter shaft 20, as shown in Figs. 1, 3 and 4.

The carriage 18 is guided on the main frame during its vertical movements by means of upright guide posts or rails 26 which preferably form upward extensions of the rear legs 12 above the table rails 10 and are of angle iron or L-shape in cross section, upper and lower pairs 27, 28 of grooved front rollers mounted on the carriage and engaging their grooves with the front edges of the longitudinal flanges of the L-shaped posts 26 at different places in the height of the latter and a pair of rear plain faced rollers 29 mounted on the carriage and engaging with the flat rear sides of the transverse flanges of said posts about midway between the upper and lower pairs of front guide rollers 27, 28. The members of each pair of front guide rollers 27 are pivoted on opposite ends of a front bearing bar 30 which is secured to upright standards 31 rising from the carriage between the front and rear ends of the latter. The pair of rear guide rollers 29 are pivoted on opposite ends of a rear bearing bar 32 arranged horizontally and transversely in rear of the standards 31 and adjustably connected with the latter by means of a pair of longitudinal bolts each of which passes with its body 33 through one of the standards 31 and has an eye 34 at its rear end which receives the adjacent part of the rear bearing bar 32 and a screw nut 35 at its front end which engages with the front side of the respective standard 26, as shown in Figs. 3 and 4. By these means the carriage is reliably guided in its vertical movements on the standards but held against transverse movement thereon and the guide rollers can also be easily adjusted relative to the standards so as to take up wear on the parts and cause the carriage to run true and without any horizontal play or vibration, thereby ensuring accurate cutting of the workpiece by the blade and avoiding breakage of the latter.

Raising and lowering of the carriage with the parts mounted thereon is effected by means which are preferably constructed as follows:

The numeral 36 represents a vertical shifting rod arranged in rear of the main frame and pivotally connected at its upper end by a bolt 37 with the central part of the side flanges of the carriage 18 while its lower end extends downwardly to a point between the upper and lower parts of the main frame and is pivotally connected at a point intermediate of its upper and lower ends by a bolt 38 with the rear end of an intermediate lever 39 which swings vertically within the main frame below the track 10 and is pivoted on a transverse rod 40 mounted on the front part of the main frame, as shown in Figs. 1 and 2.

Upward movement of the carriage and its load is effected by spring lifting means which also operate to hold the carriage yieldingly in its uppermost position. These lifting means comprise two upwardly diverging springs 41 of helical form which are connected at their lower close together ends by a pin 42, or otherwise with the lower end of the lifting rod 36 while their upper spread apart ends are connected, respectively, by pins 43 or the like, on the rear side of the upper parts of the guide posts of the frame. By this arrangement of the lifting springs 41 the same always tend to pull the shifting rod upwardly in a central position instead of pulling the same laterally in either direction. Within the frame below the intermediate lever is arranged a vertically swinging treadle or foot lever 44 which is pivoted at its rear end on a pivot rod 45 arranged transversely and horizontally and connected at its opposite ends with the rear legs of the main frame. At its front end the foot lever is provided with a pedal 46 which is adapted to be depressed by the foot operator and between its front and rear ends the foot lever is connected with the intermediate lever between the ends thereof by an upright link 47.

Upon depressing the treadle the carriage is lowered for bringing the lower edge portion of the cutter into the path of the workpiece and while the latter is thus lowered the table is moved forward and backward a number of times in order to repeatedly cut the workpiece, the resulting kerf in the latter gradually becoming deeper as the cutting progresses. The number of reciprocations of the workpiece which are required depends on the thickness of the article being cut but if the latter is very thin one stroke of the article in engagement with the cutter may be sufficient.

During the downward movement of the treadle the lifting springs 41 are stretched and when the pressure on the treadle is removed, the resilience of these springs lifts the treadle and disengages the cutter from the workpiece. The extent of the upward movement of the treadle and the height which the cutter is raised from the workpiece is limited by a stop 48 which is engaged by the upper side of the treadle and which is preferably constructed of rubber so as to operate as a bumper or cushion for yieldingly arresting the upward movement of the treadle and the parts connected therewith. This stop is also adjustable for the purpose of taking up wear on the same and also locating the cutter accurately relative to the work piece which is being cut. This adjustment is preferably effected by a screw 49 connected with this stop and working in a threaded opening formed in a plate 50 secured to the brace 13 of the main frame, as shown in Figs. 1 and 2.

In addition to the adjustable stop 48 a positive stop may be employed for limiting the upward movement of the cutter supporting carriage and the parts connected therewith which positive stop may consist of a horizontal transverse stop rod 60 connecting the upper parts of the guide posts 26, as shown in Fig. 3, and adapted to be engaged on its underside by the upper ends of the carriage standards 31 in the uppermost position of the latter, as shown in Figs. 1 and 4.

These means for varying the distance of upward and downward stroke or throw of the cutter supporting carriage may also be utilized to adjust the length of this stroke to suit the height of the workpiece which is being cut and thus avoid unnecessary slack or idle movement of the cutter toward and from the workpiece when the same is of comparatively short height.

When the cutter blade is new and of relatively large diameter the extent of its downward movement for bringing the same into engagement is comparatively short, but as the diameter of the cutter gradually becomes less due to wear, the extent of its downward movement for engaging the workpiece gradually increases. It is desirable, however, to maintain a substantially uniform throw of the treadle notwithstanding this variation in diameter of the cutter blade or saw, inasmuch as it is more comfortable and efficient for the operator after becoming used to a certain stroke of the treadle to maintain the same instead of varying the extent of this stroke considerably from time to time.

Means have therefore been provided for adjusting the position of the blade supporting carriage relative to the path of the workpiece without materially changing the vertical throw of the treadle which means preferably consist in pivotally connecting the lower end of the link 47 in a permanent location by a bolt 51, or the like, and pivotally connecting the upper end of this link with the intermediate lever 39 at different points in the length thereof by a bolt 52, or the like, which is adapted to be passed through one or another of a plurality of holes 53, 54, 55 formed in this lever at different distances from its fulcrum. Upon engaging the bolt 52 with the foremost opening 53 in the intermediate lever the link 47 will be in an upright position, as shown by full lines in Fig. 1, whereby the treadle when depressed a predetermined extent, as from a horizontal position shown by full lines in Fig. 1 to a forwardly inclined position shown by dotted lines in the same figure, will start the depression of the intermediate lever and the cutter blade from the uppermost positions of the same, as shown by full lines in Fig. 1, and thus lower the cutter blade the greatest distance for cutting the workpiece. Upon shifting the pivot bolt 52 from the foremost hole 53 to the next rearward or intermediate hole 54 in the intermediate lever the latter will be lowered to the intermediate position indicated by dotted lines 39¹ in Fig. 1, and thus cause the stroke of the intermediate lever to be shortened and the cutter blade to begin its downward stroke at a lower point but terminate the end of this stroke at the same point. The machine is operated when the connection between the link and the intermediate lever is in the last mentioned position, and thus eliminates idle motion of the cutter during the initial part of its downward stroke, when using a cutter blade which is of smaller diameter or has been reduced in diameter by wear, and thus expedite the cutting operation. When the cutter has been still further reduced in diameter the pivot bolt 52 is shifted into engagement with the rearmost hole 55 in the intermediate lever whereby the latter is lowered another step to the position indicated by dotted lines 39², whereby the position at which the cutter supporting carriage starts its downward movement will be lowered, and thus shorten its downward stroke and eliminate idle motion using a cutter blade of still smaller diameter. These adjustments are also valuable for operating on thin or thick workpieces regardless of whether the blade is new and of large diameter or worn to a small diameter.

Dust removing means are provided whereby the dust which is produced during the operation of cutting a workpiece is removed immediately from the locality of production and carried away from the machine and disposed of in any suitable manner so as to be harmless and not affect the comfort and health of the operator or other persons in the vicinity where the machine is being used. The dust removing means which are shown in the drawings and which embody this invention are constructed as follows:

The numeral 56 represents a hood or guard which encloses the upper part of the rotary cutting blade but is open on its underside to permit the lower part of the blade to project downwardly from the hood and engage the workpiece to be cut. This hood is preferably secured to the cutter supporting carriage so as to form a unitary part thereof and move in unison therewith at all times.

The lower rear part of the circular cutter is arranged within the front part of a dust catching chamber 57 which is formed partly by a body which is movably supported on the cutter carriage so as to be capable of horizontal as well as vertical movement relative to the cutter and partly by a pan which is movably mounted on this body so as to be movable lengthwise thereon and also move vertically relative thereto for adapting the dust collecting chamber to the varying positions of the workpiece during the operation of cutting the latter. The body of the dust catching chamber is preferably made of sheet metal and comprises a horizontal top wall 58 extending rearwardly from the lower part of the rear side of the hood 56 and two upright side walls 59 projecting downwardly from opposite longitudinal edges of the top wall 58 and having their front parts arranged on opposite outer sides of the lower rear part of the cutter and the outer side of the adjacent parts of the hood. On its front part the top of the dust catching body is provided with an outlet 61 through which dust entering this chamber is discharged and delivered by any suitable pneumatic exhausting and propelling device to the external atmosphere, or to a screen or the like whereby the dust is separated from the dust laden air and retained in a receptacle while the dust-free air is discharged to the atmosphere. A device for disposing of the dust which is discharged through the outlet 61 may be variously constructed and may, as shown in Fig. 1, comprise a power operated suction fan or blower 9 the inlet 8 of which receives the dust and air from the outlet 61 of the dust catcher through a flexible hose 7 and the outlet 6 of which discharges the dust laden air to a screen or porous filter bag 5 whereby the purified air is permitted to escape to the atmosphere but the dust separated from the air is retained in this bag.

The body of the dust catching chamber is supported so that the same can swing both horizontally and vertically with a parallelogram motion relative to the cutter and this is preferably accomplished by means of a pair of front links 62, and a single rear link 63. This mounting also maintains the body of the dust catcher horizontally or at right angles to the vertical movement of the cutter supporting carriage. The front links 62 are arranged on opposite sides of the hood and the catcher body and each of these links inclines rearwardly and is pivoted at its upper end to the respective outer side of the hood while its lower end is pivoted to the outer side of the corresponding side wall of the catcher body. The single rear link 63 also inclines rearwardly parallel with the front catcher links 62 and is pivoted at its upper end on one of the standards 31 of the cutter carriage while its lower end is pivoted to the top wall of the catcher body, thus forming a movable parallelogram, as shown in Figs. 1, 3 and 4. By means of these links the dust catcheer body and the parts mounted thereon, when free to move by the force of gravity, are directed downwardly and forwardly in an arc relative to the cutter but when the cutter carriage descends independently of the dust catcher mechanism during the operation of cutting a workpiece the catcher body and associated parts move backwardly and uppwardly in an arc relative to the cutter. The downward and forward swinging movement of the dust catcher mechanism may be limited by stop means of any suitable chcaracter but preferably by means of a stop 64 formed on the rear part of the cutter hood 56 and adapted to be engaged by the front edge cf the top wall 58 of the catching chamber 57, as shown in Figs. 4 and 5.

In its lowermost and foremost position the front end of the lower edge portion of the side walls of the catching chamber are arranged vertically in line with the axis of the cutter and each of these parts of these side walls is provided on its outer side with a gage 65 which is arranged slightly inside of the periphery of the circular cutter, as shown in Figs. 1, 4, 5, 7 and 8, and is adapted to engage with the rear surface of the workpiece which is being cut and also rest against the top face of the same. These gages preferably consist of rollers which are pivoted to the side walls 59 of the dust catcher body and are made of hard rubber or fibrous material to provide a yielding or non-abrasive engagement with the workpiece. The weight of the catching chamber and associated parts is preferably counterbalanced by a spring 66 connecting the rear link 63 with the bar 32 which carries the rear carriage rollers 29, but any other suitable means may be employed for this purpose.

In order to confine the admission of air into the catching chamber mainly to its underside adjacent to the lower edge portion of the cutter where the latter cuts the workpiece and produces the dust, the side walls of the catching chamber are arranged close to opposite vertical longitudinal sides of the hood 56, and the latter is provided on its rear side with an upwardly curved closing flange 67 the rear outer side of which is substantially concentric with the pivotal connection between the upper ends of the front links 62 and the hood 56, as shown in Figs. 1, 4, 5, 7 and 8. As the catching chamber swings horizontally and vertically the front edge of its top wall 58 moves close to the curved face of the closure flange 67 and prevents undue leakage of air into the catching chamber 57 at this place.

The pan forms a movable closure for the underside of the dust catching chamber so as to confine the admission of air into the catching chamber mainly to the underside of the front end of this chamber where the cutter engages the workpiece and produces dust during the operation of moving the workpiece relative to the cutter and thus ensuring catching practically all of the dust and preventing escape of the same into the nearby atmosphere. This closure pan is preferably constructed of sheet metal and comprises two vertical side walls 68 arranged lengthwise on the inner sides of the side walls of the catcher body, a horizontal bottom wall 69 connecting the front parts of the lower longitudinal edges of the pan side walls, and an inclined rear wall 70 extending upwardly and rearwardly from the rear edge of the bottom wall 69 and connected at its transversely opposite edges with the side walls 68, thereby forming a closure for the rear end of the dust catching chamber which has the general shape of a dust pan or scoop which is open at the front and top but forms, in connection with the catcher body, a dust chamber which is closed on its top and bottom and at its rear end and has its front end open for admitting dust laden air produced by the operation of the cutter on the workpiece.

This dust pan is mounted on the catcher body so as to move vertically with the same and the cutter but is capable of moving horizontally independently thereto for maintaining the inlet at the front end of the catcher chamber mainly in communication with the space adjacent to the cutter and that part of the workpiece which is being cut and thus insure the removal therefrom of practically all the dust produced during this cutting operation.

The dust catching pan and the catcher body are adjustably connected so that the front end of this pan bottom will always engage with the rear side of the workpiece and the catcher body will always engage the top of the workpiece when cutting kerfs of different depths therein and thus concentrate the dust removing suction to the area which is being cut.

The preferred means for thus connecting the dust pan and the catcher body and maintaining a comparatively tight joint between the catching chamber and the workpiece during the operation of cutting the latter are constructed as follows:

The numeral 71 represents two rails arranged lengthwise of the lower parts of the outer sides of the side walls of the catcher body, and 72 represents two guide rollers running on these rails and mounted on hangers 73 extending from the rear parts of the dust pan side walls downwardly and upwardly around these walls and said rails, as shown in Figs. 1, 3–8 and 9. By these means the pan is capable of moving rearwardly and forwardly on the catcher body and the front part can also be raised and lowered by turning on the axis of the guide rollers. The extent which the front end of the catcher body can move vertically downward relative to the front end of the pan is limited by stop means which preferably consist of a stop pin 74 arranged on the front part of one of the pan side walls and adapted to be engaged by the lower edges of the adjacent catcher body side walls 59, as shown in Figs. 1, 4 and 6.

The numeral 75 represents a transverse bearing roller of fiber or hard rubber which is rotatably mounted on the front edge of the dust pan bottom 69 and which is adapted to engage the rear side of the workpiece which is being cut. In the foremost position of the dust catching pan its bearing roller 75 is arranged vertically in line, or substantially so, with the axis of the circular cutter blade, as shown in Figs. 1 and 4.

As the workpiece moves rearwardly while being cut it pushes the dust catching pan rearwardly by engagement with the bearing roller 75, as shown in Fig. 5, and maintains a relatively air-tight joint between the same at this place.

Means are provided for vertically adjusting the body and pan of the dust catching chamber so that the front ends of the same are in the desired position relative to the axis of the cutter disk to suit various diameters of cutters and maintain necessary clearance between the front edge of the pan and the peripheral edge of the cutter when the latter is new or little worn and of large diameter as well as when the same is worn and of comparatively small diameter.

Although various means may be employed for vertically adjusting the pan and catcher body relative to the periphery of the cutter, those shown in the drawings are preferred and constructed as follows:

Referring to Figs. 1 and 3 to 8, the numeral 77 represents an adjusting shaft journaled transversely and horizontally in bearings on the lower rear part of the dust pan and provided on its inner end with a controlling arm 78 which inclines upwardly and forwardly along the inner upright wall of the catcher body while the outer end of this shaft is provided with an adjusting arm 79 which inclines upwardly and forwardly along the upright outer wall of the catcher chamber. At its upper front end the controlling arm 78 is provided with a runner 80, preferably in the form of a roller which travels forwardly and backwardly in a horizontal grooved or channel-shaped guide rail or track 81 mounted lengthwise on the adjacent part of the cutter carriage. The adjusting arm 79 may be secured in different vertically turned positions relative to the catcher body by means of a clamping bolt 82 mounted in a definite position on the outer wall of the dust catching body and adjustably secured in different positions in a segmental slot 83 in the adjusting arm 79, as shown in Figs. 1, 3 and 6.

Upon raising and lowering the pan and the catcher body the rear end of the control arm 78 will be raised and lowered and accordingly turn about the axis of the roller 80 on its front end and after the pan and catcher body have been adjusted to the desired position the same are held there by tightening of the bolt 82. The upward extreme of this adjustment of the pan and body by these means is shown in Fig. 7 which is suitable for using a cutter disk of the smallest diameter, while in Figs. 4 and 8 the pan and body are shown in the lowest position as would be required when adapting the pan and catcher body to a cutter blade of large diameter.

During the reciprocating movement of the pan relative to the catcher body the pan and body are retained in the required position relative to each other inasmuch as the runner 80 of the adjusting mechanism at this time merely travels back and forth in the guideway 81.

When free the pan of the dust catching chamber is constantly urged forwardly by a spring 84 which connects the outer upright wall of the pan with the corresponding upright wall of the catcher body, as shown in Figs. 1, 3 and 6, and the forward movement of the pan is limited by stop means which preferably consist of a stop 85 arranged at the front end of the longitudinal guide 81 and adapted to be engaged by the runner 80 in the foremost position of the pan, as shown in Figs. 3, 4, 7 and 8.

In order to concentrate the admission of air to the front end of the dust catching chamber 57 a relatively leaktight joint is maintained between the rear part of the dust pan and the catcher body by providing the upper end of the rear wall 70 of the dust pan with a segmental sealing flange or surface 76 which is curved concentrically with the axis of the guide rollers 72 of the pan and which moves close to the top wall 58 of the catcher body and avoids the formation of an undue gap between these parts of the dust pan and catcher body and prevents any considerable amount of air entering the catching chamber at this place.

The sequence of operations of this machine, briefly, is as follows:

Assuming that the disk-shaped cutter blade is new or comparatively large in diameter the body and pan of the dust catching chamber are so adjusted that in the position to begin the operation of cutting a workpiece both the gage rollers 65 of the catcher body and the bearing roller 75 of the catching pan are spaced a considerable distance below the axis of the cutter and substantially vertically in line therewith and the gage rollers 65 being arranged inside of the periphery a distance equal to the minimum depth of the kerf to be cut in the top of the workpiece without moving the catcher body rearwardly and the bearing roller 75 of the pan being arranged outside of this periphery a distance sufficient to permit a stream of air to be drawn into the catching chamber 57 to properly carry away the dust which is produced.

Upon now lowering the cutter carriage so that the underside of the gage rollers 65 are horizontally in line with the top of the workpiece 16 preparatory to cutting the latter, as shown in Fig. 4, and then moving the latter rearwardly by means of the feed table 14, the first effect is for the lower part of the rotary blade to effect cutting of the initial part of a kerf or groove into the top of the workpiece from the rear side toward the front side of the same. As the workpiece continues its rearward movement the top of the same passes underneath the gage rollers 65 without raising the same or any parts connected therewith and at the rear side of the workpiece engages with the pan bearing roller 75. During the continued rearward movement of the workpiece after its rear end engages the pan bearing roller the dust catching pan is moved rearwardly in opposition to the spring 84, whereby the latter is increasingly strained and a practically air-tight joint is made by the dust catching chamber and the workpiece so as to concentrate the suction effect of the exhausting device to the locality where the cutting of the workpiece is taking place and thus carry away the maximum amount of dust which is produced. While the dust pan is thus pushed rearwardly the same moves bodily horizontally but not vertically nor does it turn vertically relative to the catcher body with which it is pivotally connected. This rearward movement of the dust catching pan and the workpiece continues in unison until a kerf of the desired length has been cut in the top of the workpiece without disturbing the position of the catcher body, as shown in Fig. 5. While the catching pan is thus moving rearwardly it is guided horizontally due to its guide rollers 72 running on the horizontal tracks 71 of the catcher body and the roller 80 of the pan and body adjusting mechanism running in the track 81 of the cutter carriage.

When this kerf has been completed and the operator withdraws the workpiece forwardly from the cutter blade and the body gage rollers 65 and the pan bearing roller 75, the pan is automatically moved to its foremost position by the spring 84 and limited in this forward movement by engagement of the roller 80 with the stop 85, as shown in Fig. 4.

When it is desired to cut a kerf in the top of the workpiece which is deeper than the distance from the underside of the gage rollers 65 to the periphery of the cutter then the workpiece is moved rearwardly relative to the rotary cutter blade and the body gage rollers 65 and pan roller 75 with the top of the workpiece arranged above the underside of the gage rollers the requisite distance. When feeding such a workpiece to the cutter, as shown in Fig. 8, the first part of the kerf is cut by the blade in the top of the workpiece from the rear side toward the front side thereof without disturbing the body and pan of the dust catching chamber but after passing rearward of a vertical line through the axis of the cutter blade the rear side of the workpiece engages the body gage rollers 65 and the pan bearing roller 75 and pushes the catcher body and catching pan backwardly. During this continued backward movement of the workpiece the catcher body is not only pushed backward in unison with the workpiece but also lifted due to the parallel links 62, 63 and the gage rollers 65 move upwardly in a rearwardly curving arch with the rear side of the workpiece from the position shown in Fig. 4 until they reach the top of the workpiece, as shown in Fig. 8. After this the workpiece continues its rearward movement to the end of this stroke, during which time the top of the workpiece rides under the gage rollers 65 while the catcher body is at rest. As the catcher body is lifted by the links 62, 63 the rear part of the catcher pan is also lifted but the bearing roller 75 at its front end remains in engagement with the same part on the rear side of the workpiece because the catcher pan at this time merely turns in a vertical plane about an axis which is formed by the roller 80 engaging the front end of the track 81, thereby maintaining a practically tight joint between the dust removing device and the workpiece adjacent to the cutter at this time. The parts remain in this relative position until the respective cut has been completed inasmuch as the pan is maintained in this position during the remainder of its rearward movement by pan guide rollers 72 running on the guideways 71 of the catcher body and the roller 80 of the catching pan and body running rearwardly in the horizontal track 81.

Upon moving the workpiece forwardly away from the cutter and the dust catching device the catcher body again swings downwardly in an arch by gravity and is guided by the links 62, 63 from the elevated rearward position shown in Fig. 8 to the lowered forward position shown in Fig. 4, and the catching pan is also moved forwardly by the spring 84 and lowered at its rear end by the catcher body from the inclined position shown in Fig. 8 to its normal horizontal position shown in Fig. 4.

When the diameter of the cutter has been materially reduced by wear of its peripheral cutting edge it is necessary to adjust the dust catching mechanism so as to maintain the dust catching chamber and its gage rollers 65 and bearing roller 75 in the proper relation to the circular cutting blade. This is accomplished by raising the dust catching chamber as much as required to compensate for the wear of the cutter blade by loosening the bolt 82 of the adjusting mechanism, then turning the control arm 78 about its front roller 80 as an axis so as to raise its rear end from the steeply inclined position shown in Figs. 4, 5 and 8 to the almost horizontal position shown in Fig. 7, thereby raising the dust catching mechanism for use in connection with the smaller cutting blade shown in Fig. 7 and still maintaining the working parts of the dust collecting device in nearly the same operative relation to the cutting blade as exist when used in connection with the cutter disk of large diameter shown in Figs. 4, 5 and 8.

When operating on soft material, such as gypsum or wood, it is possible to complete the cutting of a kerf with a single stroke but when cutting cementitious material, such as tile, concrete building blocks, planks and so forth a plurality of rearward and forward strokes of the workpiece are commonly used to complete the work.

It will be noted that in the use of the dust removing apparatus a chamber is formed between the cutter and the workpiece adjacent to the place where the dust is produced by the operation of the cutter on the workpiece which is practically closed on all sides and thus enables the exhausting device which is connected with the dust catching chamber to effectively remove therefrom the dust laden air which has been taken into this chamber and enable the same to be disposed of in a manner which is not objectionable.

In the use of this dust collector no adjustments of any parts are required for cutting materials of different height or thickness, or different depths of kerfs, inasmuch as this apparatus adapts itself automatically to these differing conditions. It is only necessary to adjust the catching chamber manually relative to the circular cutting blade for the purpose of taking up wear on the periphery of this blade or to suit cutter blades of different diameters.

In machines as heretofore constructed the cutter was mounted on a vertically rocking support which at times would incline forwardly and upwardly relative to the horizontally movable table carrying the workpiece which was liable to produce a jamming or binding engagement of the workpiece with the dust collecting device and if the rocking support inclined forwardly and upwardly then the dust collecting device would be liable to scrape over the top of the workpiece and produce a chattering effect. Both of these objections are eliminated in the present invention in which the line of movement of those parts of the dust catching device which are engaged by the workpiece are always horizontal and parallel and thus avoid angular engagement of these parts.

Owing to the automatic means for adjusting the dust catching mechanism to suit different depths of kerfs which are to be cut in material and also the means for adapting the apparatus to different sizes of cutter blades, this apparatus permits of doing work of this character expeditiously and economically while safe guarding the comfort and health of the operator and those in the neighborhood.

Moreover, this construction and the automatic adjustment embodied therein which adapts its sealing faces to varying conditions, enables a much smaller amount of air to be used in a most efficient manner. This lower consumption of air cuts down the horsepower and size of the suction apparatus making it practical to attach the same to this machine and still have a portable apparatus.

It is to be observed in this apparatus that in such places where an opening of the dust collecting chamber extends to the outer atmosphere, such opening is beneficial inasmuch as it permits the admission of air into the chamber which is utilized to carry any dust which may be on the exterior of the apparatus to the interior of the dust catching chamber and then discharged through the outlet of the latter.

Aside from acting as means for collecting dust produced during the operation of cutting a workpiece, this apparatus also acts as a guard or safety device for protecting persons in rear of the same from being injured by flying pieces of the cutters which latter are made of fragile abrasive material and sometimes break due to vibration or defects in manufacture and when rotating at a very high peripheral speed throw the small pieces with such force that they are capable of penetrating a board as high as one inch in thickness.

I claim as my invention:

1. A machine for cutting tile and like workpieces, comprising a frame having a horizontal track and a vertical guideway including upright guide posts arranged on the frame in rear of said track, a table movable back and forth on said track and adapted to support the workpiece to be cut, a cutter adapted to engage the workpiece, a vertically movable carriage supporting said cutter, fixed guide rollers engaging one side of said guide posts and journaled on fixed bearing rods on the carriage, adjustable guide rollers engaging with the opposite sides of said guide posts, an adjustable rod on which the adjustable rollers are journaled, and means for adjustably connecting said adjustable rod with said carriage including a bolt having a body passing through a part of said carriage and provided at one end with an eye which receives said adjustable rod, and a screw nut arranged on the opposite end of said body and engaging with the opposite side of said carriage part.

2. A machine for cutting tile and like workpieces, comprising a frame provided with a horizontal track and a vertical guideway, a table movable back and forth on said track and adapted to support the workpiece, a carriage movable vertically on said guideway, a cutter mounted on said carriage and adapted to be moved into and out of the path of said workpiece for causing the latter to be cut, and means for moving said carriage vertically including an intermediate lever pivoted at one end on the frame and operatively connected at its opposite end with said carriage, a foot lever pivoted on the frame and means for varying the throw of the intermediate lever but maintaining the throw of the foot lever including a link permanently pivoted at one of its ends at one location on the foot lever and adjustably pivoted at its other end on said intermediate lever at different points in the length of said intermediate lever.

3. A machine for cutting tile and like workpieces, comprising a frame provided with a horizontal track and a vertical guideway, a table movable back and forth on said track and adapted to support the workpiece to be cut, a carriage movable vertically on said guideway, a cutter mounted on said carriage and adapted to be moved into and out of the path of said workpiece, and means for moving said carriage vertically including a vertically swinging lever pivoted at one end on said frame, a rod having one end connected with said carriage and its intermediate part connected with the opposite end of said lever, and spring means for raising said carriage and the parts connected therewith including upwardly diverging spring means connected at their lower ends with the lower end of said rod and connected at their upper ends with said frame.

4. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to move vertically relatively to the workpiece, a pan section which conducts the dust from said cutter to said body section and which is adapted to move horizontally with the workpiece and means for mounting said body and pan sections to permit such movements.

5. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to engage with the workpiece and move horizontally and vertically, a pan section which conducts the dust from said cutter to said body section and which is adapted to engage with the workpiece and move horizontally therewith and vertically with said body section and means for mounting said body and pan sections to permit such movements.

6. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to rest on top of the workpiece and swing vertically relative thereto, a pan section which conducts the dust from said cutter to said body section and which is adapted to engage with the rear end of the workpiece and to move horizontally therewith and to said body section and means for mounting said body and pan sections to permit such movements.

7. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to rest on top of the workpiece and swing vertically relative thereto, a pan section which conducts the dust from said cutter to said body section and which is adapted to engage with the rear end of the workpiece and to swing vertically relative to the workpiece and said body section and means for mounting said body and pan sections to permit such movements.

8. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to move vertically relative to the workpiece, a pan section which conducts the dust from said cutter to said body section and which is adapted to move horizontally with the workpiece and means for mounting said body and pan sections to permit such movements, and means for withdrawing dust laden air from said catching chamber.

9. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to the place where the same operates on the workpiece and which has a body section connected with a suction device and adapted to move vertically relative to the workpiece and having an outlet in its top for dust laden air, a pan section which conducts the dust from said cutter to said body section and which is adapted to move horizontally with the workpiece and means for mounting said body and pan sections to permit such movements, and means for withdrawing dust laden air from said chamber communicating with said outlet of the body section.

10. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, means whereby engagement of the workpiece and body section will move the latter rearwardly and upwardly, and means whereby engagement of the workpiece with the pan section will cause the latter to move rearwardly on the upper body section.

11. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, means whereby engagement of the workpiece and body section will move the latter rearwardly and upwardly, including front and rear inclined links connecting the front and rear parts of the body section with relatively stationary supports, and means whereby engagement of the workpiece with the pan section will cause the latter to move rearwardly on the body section including longitudinal guideways arranged on the body section and runners arranged on the pan section and moving along said guideways.

12. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, gage rollers arranged on the front part of the body section and adapted to be engaged by the upper side of the workpiece, and a bearing roller arranged on the front part of the pan section and adapted to be engaged by the rear side of the workpiece.

13. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, means whereby engagement of the workpiece and body section will move the latter rearwardly and upwardly, and means whereby engagement of the workpiece with the pan section will cause the latter to move rearwardly on the upper body section said body section having a top and two sides depending from the longitudinal edges of said top, and said pan section being arranged within the body section and having a bottom and two sides rising from the longitudinal edges of said bottom.

14. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, means whereby engagement of the workpiece and body section will move the latter rearwardly and upwardly, means whereby engagement of the workpiece with the pan section will cause the latter to move rearwardly on the upper body section, and a hood enclosing the upper part of said cutter and having its lower part open and communicating with said dust catching chamber.

15. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, means whereby engagement of the workpiece and body section will move the latter rearwardly and upwardly, means whereby engagement of the workpiece with the pan section will cause the latter to move rearwardly on the upper body section, a hood enclosing the upper part of said cutter and having its lower part open and communicating with said dust catching chamber, and a curved sealing surface on the hood which is traversed by a front end part of said body section for maintaining a closure between said hood and the dust catching chamber.

16. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, and stop means for limiting the downward movement of said dust catching chamber relative to said cutter.

17. A machine for cutting tile and like workpieces, comprising a horizontally reciprocable table adapted to support the workpiece to be cut, a cutter relative to which said workpiece is moved by said table, and means for carrying away dust which is produced by the cutter operating on the workpiece including a dust catching chamber which encloses said cutter adjacent to where the same operates on the workpiece and which has an upper body section movable vertically relative to the cutter and the front end of which is adapted to extend over the top of the workpiece and a lower pan section adapted to be arranged in rear of the workpiece and movable horizontally with the workpiece and vertically with the body section, and means for balancing the weight of the dust catching chamber and the parts connected therewith.

18. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto.

19. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and said body section being open at its bottom and closed at its top, and said pan section being arranged within the body section and having a closed bottom and rear end and an open top, and the rear end of said pan section having a curved face which turns close to the top of said body section and forms a closure between the respective sections at this place.

20. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter.

21. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter including a controlling arm adjustably connected with said pan section and a relatively stationary guideway along which said controlling arm moves.

22. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter, including a forwardly inclined controlling arm adjustably connected at its rear end with said pan section and provided at its front end with a runner, and a relatively stationary horizontal guide channel in which said runner moves back and forth.

23. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter including an adjusting shaft adjustably mounted on said pan section, a forwardly inclined controlling arm having its rear end connected with said adjusting shaft and provided at its front end with a runner, and a horizontal guideway in which said runner moves back and forth.

24. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter, including an adjusting shaft adjustably connected with said pan section, a forwardly inclined controlling arm having its rear end connected with one end of said adjusting shaft, and provided at its front end with a runner, a horizontal guideway in which said runner moves back and forth, and means for adjustably connecting said shaft and pan.

25. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for adjusting said body and pan sections relative to said cutter, including an adjusting shaft mounted transversely on said pan section, a forwardly inclined controlling arm having its rear end connected with one end of said adjusting shaft and provided at its front end with a runner, a horizontal guideway in which said runner moves back and forth, and means for adjustably connecting the pan section with said shaft including an adjusting arm connected with the opposite end of said adjusting shaft and provided with a slot curved concentrically with the axis of said shaft, and a clamping bolt arranged in said slot and adapted to connect said adjusting arm with the pan section.

26. A machine for cutting tile and like workpieces, comprising a reciprocable table adapted to support a workpiece, a cutter relative to which said workpiece is moved by said table, and means for carrying away dust which is produced by the operation of the cutter on the workpiece including a dust catching chamber which has an open front part enclosing that part of the cutter adjacent to where the same operates on the workpiece and which has an upper body section adapted to extend over the top of the workpiece and movable horizontally and vertically and a lower pan section adapted to be arranged in rear of the workpiece and movable horizontally on the body section and turning vertically relatively thereto, and means for yieldingly holding said pan section in its foremost position on the body section.

CHARLES A. MARTIN.